(12) United States Patent
Roach et al.

(10) Patent No.: US 9,290,274 B2
(45) Date of Patent: Mar. 22, 2016

(54) ACOUSTICALLY ATTENUATING SANDWICH PANEL CONSTRUCTIONS

(71) Applicant: MRA Systems, Inc., Baltimore, MD (US)

(72) Inventors: Andrew Michael Roach, Aberdeen, MD (US); Graham Frank Howarth, Middletown, DE (US)

(73) Assignee: MRA SYSTEMS, INC., Baltimore, MD (US)

( * ) Notice: Subject to any disclaimer, the term of this patent is extended or adjusted under 35 U.S.C. 154(b) by 0 days.

(21) Appl. No.: 14/293,589

(22) Filed: Jun. 2, 2014

(65) Prior Publication Data

US 2015/0344142 A1    Dec. 3, 2015

(51) Int. Cl.
| | |
|---|---|
| *F02K 1/82* | (2006.01) |
| *B64D 33/02* | (2006.01) |
| *E04B 1/82* | (2006.01) |
| *F02K 1/78* | (2006.01) |

(52) U.S. Cl.
CPC . *B64D 33/02* (2013.01); *E04B 1/82* (2013.01); *B64D 2033/0206* (2013.01)

(58) Field of Classification Search
USPC ............. 181/292, 290, 288, 293; 244/53 B
See application file for complete search history.

(56) References Cited

U.S. PATENT DOCUMENTS

| | | | | |
|---|---|---|---|---|
| 1,832,741 A * | 11/1931 | Sersen et al. | ................. | 181/292 |
| 2,525,219 A | 10/1950 | Green | | |
| 2,840,179 A * | 6/1958 | Junger | ......................... | 181/286 |
| 3,380,206 A * | 4/1968 | Barnett | .......................... | 52/145 |
| 3,481,427 A | 12/1969 | Dobbs et al. | | |
| 3,529,693 A | 9/1970 | Woodward et al. | | |
| 3,542,152 A | 11/1970 | Adamson et al. | | |
| 3,895,152 A * | 7/1975 | Carlson et al. | ................ | 428/116 |
| 4,235,303 A * | 11/1980 | Dhoore et al. | ................ | 181/214 |
| 4,940,386 A | 7/1990 | Feuvrier et al. | | |
| 5,014,815 A * | 5/1991 | Arcas et al. | .................... | 181/213 |
| 5,041,324 A * | 8/1991 | Siegling et al. | ............... | 428/119 |
| 5,259,724 A | 11/1993 | Liston et al. | | |
| 5,414,232 A * | 5/1995 | Wilson | .......................... | 181/292 |
| 5,581,054 A | 12/1996 | Anderson et al. | | |
| 5,663,536 A * | 9/1997 | Kaplan | .......................... | 181/224 |
| 5,923,003 A * | 7/1999 | Arcas et al. | .................... | 181/292 |
| 5,997,985 A * | 12/1999 | Clarke et al. | .................. | 428/116 |
| 6,123,170 A | 9/2000 | Porte et al. | | |
| 6,182,787 B1 * | 2/2001 | Kraft et al. | ..................... | 181/292 |

(Continued)

FOREIGN PATENT DOCUMENTS

| | | |
|---|---|---|
| EP | 0572725 A1 | 3/1992 |
| EP | 1277919 B1 | 7/2002 |

(Continued)

OTHER PUBLICATIONS

European Search Report and Opinion issued in connection with corresponding EP Application No. 15169869.3 on Oct. 21, 2015.

*Primary Examiner* — Edgardo San Martin
(74) *Attorney, Agent, or Firm* — GE Global Patent Operation; William S. Munnerlyn

(57) ABSTRACT

An aircraft engine assembly comprising a nacelle configured to surround the aircraft engine having an inlet open to ambient air and an annular acoustic panel provided within the nacelle. Sound emitted from the aircraft engine is attenuated by the annular acoustic panel. The annular acoustic panel comprises an open framework, made from a first material, forming a plurality of cells.

11 Claims, 5 Drawing Sheets

(56) References Cited

U.S. PATENT DOCUMENTS

| | | |
|---|---|---|
| 6,268,038 B1 | 7/2001 | Porte et al. |
| 6,439,340 B1 * | 8/2002 | Shirvan ................ 181/213 |
| 6,497,550 B2 | 12/2002 | Booth |
| 6,638,008 B2 | 10/2003 | Sathianathan et al. |
| 6,749,704 B2 | 6/2004 | Boussu et al. |
| 6,761,245 B2 | 7/2004 | Porte |
| 6,896,099 B2 | 5/2005 | Porte et al. |
| 6,920,958 B2 | 7/2005 | Harrison |
| 7,086,497 B2 * | 8/2006 | Cole et al. ................ 181/248 |
| 7,125,237 B2 | 10/2006 | Buge et al. |
| 7,255,528 B2 | 8/2007 | Stretton |
| 7,257,894 B2 | 8/2007 | Buge et al. |
| 7,484,592 B2 | 2/2009 | Porte et al. |
| 7,520,369 B2 * | 4/2009 | Dravet et al. ............. 181/292 |
| 7,563,069 B2 | 7/2009 | Harper |
| 7,718,246 B2 * | 5/2010 | Strauss ................ 428/118 |
| 7,866,939 B2 | 1/2011 | Harper et al. |
| 8,047,329 B1 * | 11/2011 | Douglas et al. ........... 181/292 |
| 8,459,407 B2 * | 6/2013 | Jangili ................ 181/224 |
| 8,733,500 B1 * | 5/2014 | Ayle ................ 181/292 |
| 2001/0005937 A1 | 7/2001 | Andre et al. |
| 2001/0048048 A1 | 12/2001 | Riedel et al. |
| 2002/0157764 A1 | 10/2002 | Andre et al. |
| 2004/0009439 A1 | 1/2004 | Nakai et al. |
| 2004/0045766 A1 | 3/2004 | Porte et al. |
| 2004/0094359 A1 | 5/2004 | Porte et al. |
| 2005/0082112 A1 | 4/2005 | Harrison |
| 2005/0167193 A1 * | 8/2005 | Van Reeth ............. 181/293 |
| 2005/0194210 A1 * | 9/2005 | Panossian ............. 181/293 |
| 2005/0252195 A1 | 11/2005 | Porte et al. |
| 2007/0045044 A1 * | 3/2007 | Sullivan ................ 181/268 |
| 2008/0083497 A1 | 4/2008 | Dublineau et al. |
| 2008/0135327 A1 * | 6/2008 | Matsumura et al. ........ 181/151 |
| 2008/0206044 A1 | 8/2008 | Porte et al. |
| 2010/0068051 A1 | 3/2010 | Cloft et al. |
| 2011/0197973 A1 | 8/2011 | Binks et al. |

FOREIGN PATENT DOCUMENTS

| | | |
|---|---|---|
| EP | 1426587 A1 | 9/2003 |
| EP | 1591643 A1 | 11/2005 |
| EP | 1245794 B1 | 8/2008 |
| EP | 2163748 A1 | 3/2010 |
| FR | 2847304 A1 | 11/2002 |
| FR | 2869360 A1 | 4/2004 |
| GB | 2375798 A | 11/2002 |
| GB | 2403774 B | 6/2006 |
| JP | 2007230130 A | 9/2007 |
| WO | 2005090156 A1 | 9/2005 |
| WO | 2013084135 A1 | 6/2013 |

* cited by examiner

_US 9,290,274 B2_

ACOUSTICALLY ATTENUATING SANDWICH PANEL CONSTRUCTIONS

BACKGROUND OF THE INVENTION

Contemporary aircraft engines may include acoustic attenuation panels in aircraft engine nacelles to reduce noise emissions from aircraft engines. These acoustic attenuation panels generally have a sandwich structure comprising structural skins enclosing a cellular honeycomb-type inner structure.

BRIEF DESCRIPTION OF THE INVENTION

In one aspect, an embodiment of the invention relates to an aircraft engine assembly comprising a nacelle configured to surround the aircraft engine having an inlet forward of an engine fan open to ambient air. An annular acoustic panel is provided within the nacelle wherein sound emitted from the aircraft engine is attenuated by the annular acoustic panel. The annular acoustic panel comprises an open framework, made from a first material, forming a plurality of cells, and a surface treatment provided on the open framework to increase the sound attenuation of the open framework relative to the open framework without the surface treatment.

DESCRIPTION OF EMBODIMENTS OF THE INVENTION

Figure 1:
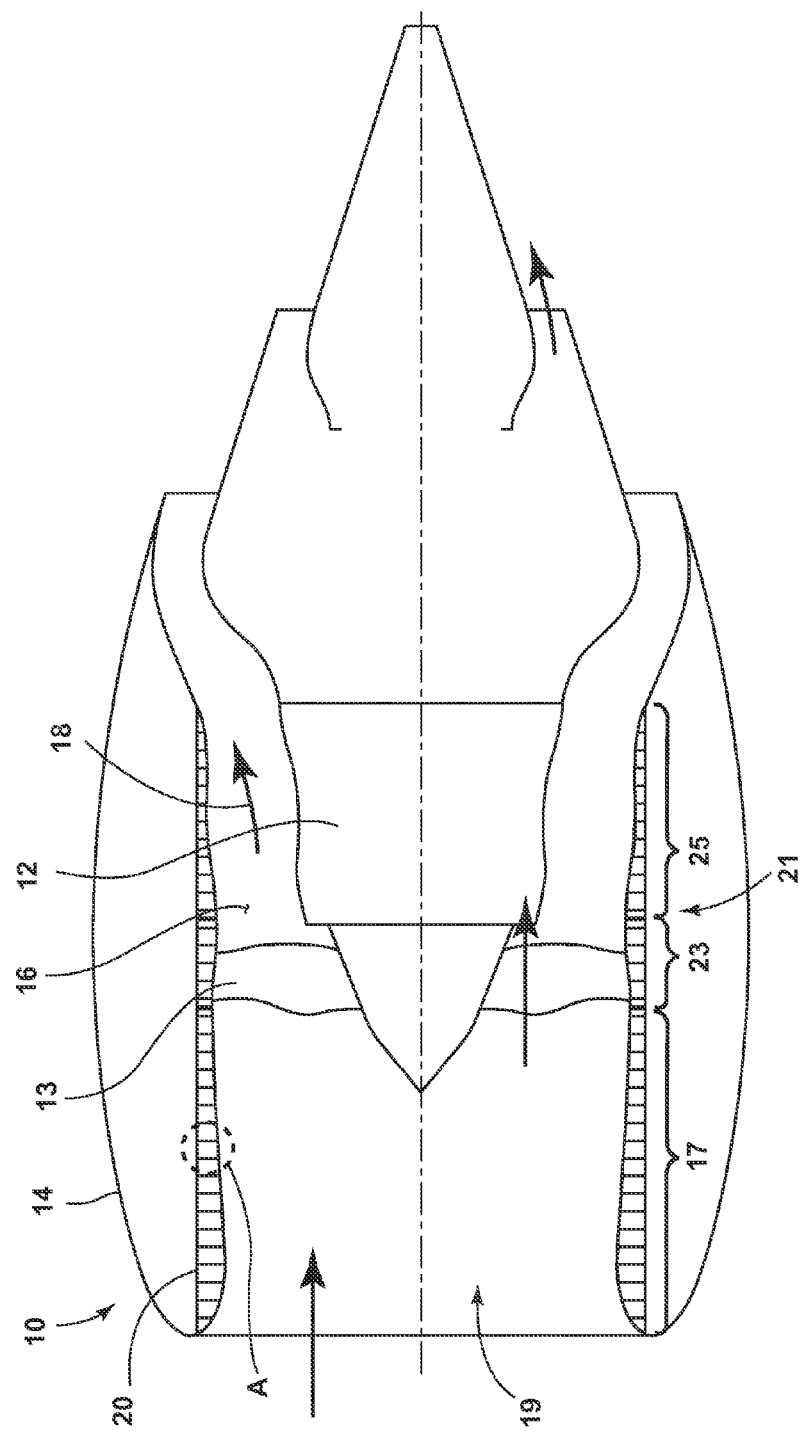
FIG. 1 is a schematic view of an aircraft engine assembly with a portion of the outer nacelle cut away for clarity.

FIG. 1 illustrates an aircraft engine assembly 10 having a turbine engine 12, a fan assembly 13, and a nacelle 14. Portions of the nacelle 14 have been cut away for clarity. The nacelle 14 surrounds the turbine engine 12 and has an inlet section 17 that defines an inlet 19 open to ambient air and an annular airflow path or annular bypass duct 16 through the aircraft engine assembly 10 to define a generally forward-to-aft bypass airflow path as schematically illustrated by the arrow 18. The turbine engine 12 may have a fan section 21 comprising an annular fan case 23 and aft duct 25 of a thrust reverser (not shown). The fan section may be provided within the nacelle wherein the fan section 21 is in fluid communication with the inlet 19. An annular acoustic panel 20 is provided within the nacelle in at least a portion of the inlet 19 or fan section 21.

Figure 2:
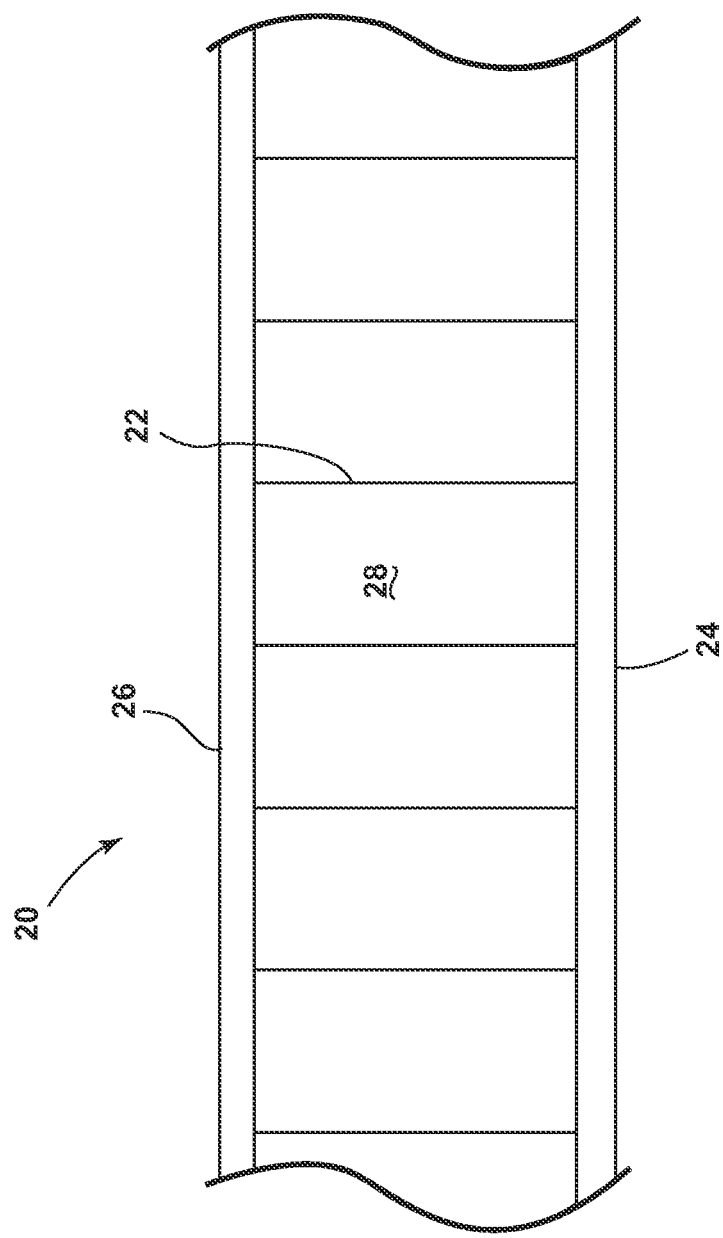
FIG. 2 is a detail view of section A of the acoustic panel of FIG. 1.

FIG. 2 shows a detail view of the annular acoustic panel of FIG. 1. The annular acoustic panel 20 comprises an open framework 22 disposed between an imperforate backing sheet 26 and a perforated front sheet 24. The open framework 22 forms a plurality of cells 28 in the open spaces between the open framework 22, the backing sheet 26 and front sheet 24 and a surface treatment is provided on the open framework 22.

Sound emitted from the aircraft engine is attenuated by the annular acoustic panel 20 wherein the surface treatment provided on the open framework 22 at least increases the sound attenuation of the open framework 22 relative to an open framework without a surface treatment.

Figure 3:
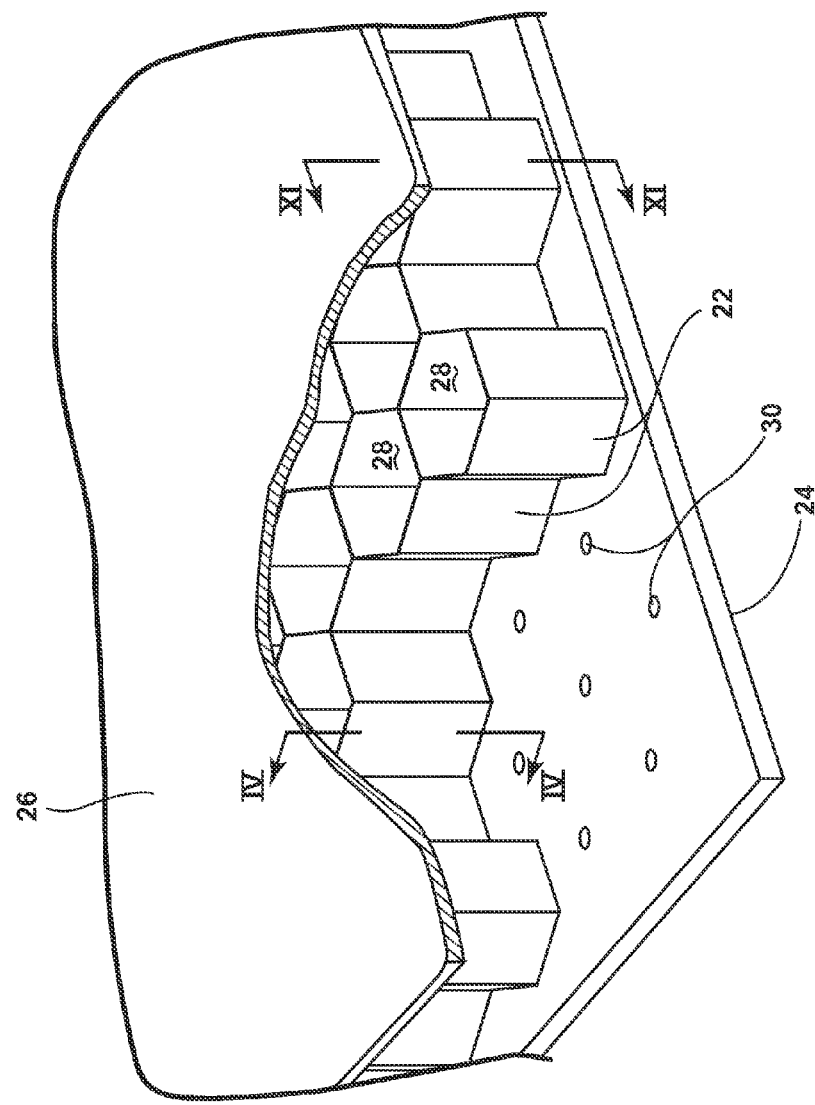
FIG. 3 is perspective view of the acoustic panel of FIG. 1 with portions removed for clarity.

As illustrated more clearly in FIG. 3, the cells 28 formed by the open framework 22 disposed between the backing sheet 26 and the front sheet 24 each have a predetermined volume defined by the geometry of the open framework 22 and the spacing between the backing sheet 26 and front sheet 24. The open framework 22 may comprise a honeycomb structure wherein each cell has six walls formed by the open frame work 22, a top wall formed by the backing sheet 26 and a bottom wall formed by the front sheet 24. The backing sheet 26 may be impervious with respect to air, and the front sheet 24 may be perforated such that a plurality of apertures 30 in a predetermined pattern are formed in the front sheet 24 to allow air into selected cells 28. The backing sheet 26 and front sheet 24 and open framework 22 may be formed such that there are no seams present in backing sheet 26 and front sheet 24 and open framework 22.

Each cell 28 may form a portion of a Helmholtz resonator wherein the area of each aperture 30 and thickness of the front sheet 24 defining the neck portion of the Helmholtz resonators and the volume of the cells 28 defining the cavity volume of the Helmholtz resonators are tuned to attenuated engine sounds having predetermined frequencies entering the Helmholtz resonators. The honeycomb cells 28 may be a single layer of hexagonal geometry or multiple layers of the same or different geometry separated by a porous layer, typically identified as a septum. In addition, alternate geometries other than hexagonal may be envisaged including random size cells formed by open cell foams or similar materials.

Engine sounds entering the cells of the annular acoustic panel 20 are further attenuated by the surface treatment provided on the open framework 22. FIGS. 4-10 illustrate different embodiments of open framework 22 surface treatments comprising at least a surface application or modification to attenuate sound wherein the surface treatment at least dampens or disperses sound waves entering the cells 28. The surface treatment may act to absorb energy of the sound waves wherein energy of the sound wave is converted into heat energy or scatter the sound waves wherein the sound waves are scattered in different directions having less intensity or amplitude than the original sound wave. In addition, the surface treatment applied to the open framework 22 may also be applied to the surface of the backing sheet 26 that forms a boundary of the Helmholtz resonator cell 28.

Figure 4:
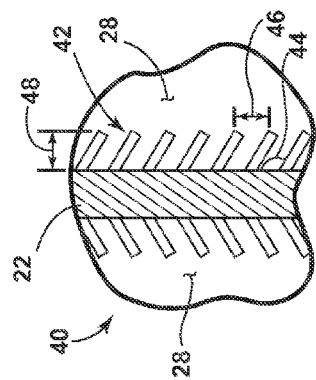
FIG. 4 is sectional view taken along line IV-IV of FIG. 3 showing the open framework of the acoustic panel according to an embodiment of the invention.

FIG. 4 illustrates a surface modification comprising forming nanostructures 40 on the open framework 22 surfaces according to an embodiment of the invention. A nanostructure growth catalyst may be applied to the open framework 22 by methods including but not limited to spray, drip or chemical vapor deposition and the nanostructures 40 may either be grown directly on the open framework 22 or deposited by other means after formation. The nanostructures 40 may comprise a plurality of filaments 42 having a predetermined length 48 projecting away from the open framework 22 at a predetermined angle of projection 44 at a predetermined porosity defined by filament spacing 46.

The filament 42 length 48, angle of projection 44, porosity and material may be selected to attenuate one or more predetermined frequencies of sound. The filaments 42 may attenuate sounds by forming them to dampen the sound waves using absorption thereby converting the sound waves into heat energy and/or disperse the sound waves by scattering the sound waves wherein the filaments 42 act as the scatterer thereby reducing the intensity of the resultant scattered sounds waves compared to the original sound wave.

Figure 5:
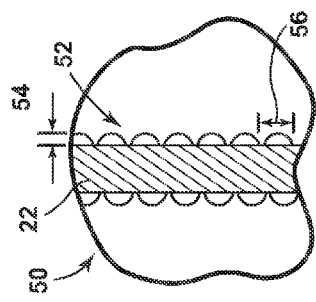
FIG. 5 is sectional view taken along line IV-IV of FIG. 3 showing the open framework of the acoustic panel according to another embodiment of the invention.

FIG. 5 illustrates a surface modification comprising applying a particulate layer 50 on the open framework 22 surfaces according to an embodiment of the invention. The particulate layer 50 comprises a plurality of particles 52 of a predetermined spacing 56, height 54 and shape selected to attenuate one or more predetermined frequencies of sound applied to the open framework 22 by methods including but the limited to spray coating, drip coating, chemical vapor deposition or additive manufacturing. The particles 52 may attenuate sounds by selecting a material to dampen the sound waves using absorption thereby converting the sound waves into heat energy and/or disperse the sound waves by selecting a particle size, shape and spacing to scatter the sound waves wherein the particles 52 act as the scatterer thereby reducing the intensity of the resultant scattered sounds waves compared to the original sound wave.

Figure 6:
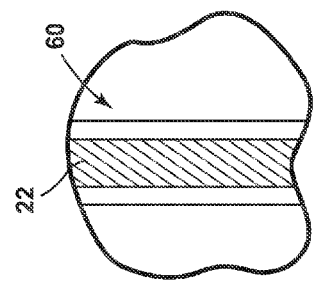
FIG. 6 is sectional view taken along line IV-IV of FIG. 3 showing the open framework of the acoustic panel according to another embodiment of the invention.

FIG. 6 illustrates a surface modification comprising applying a polymer layer 60 on the open framework 22 surfaces according to an embodiment of the invention. The polymer layer 60 comprises a coating of a polymer acoustically attenuating material applied to the open framework 22 by methods including but the limited to spray coating, drip coating, chemical vapor deposition or additive manufacturing. The polymer layer 60 may attenuate sounds by selecting a material to dampen the sound waves using absorption thereby converting the sound waves into heat energy.

Figure 7:
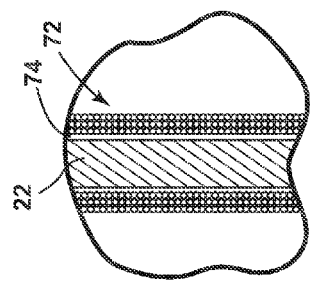
FIG. 7 is sectional view taken along line IV-IV of FIG. 3 showing the open framework of the acoustic panel according to another embodiment of the invention.
Figure 8:
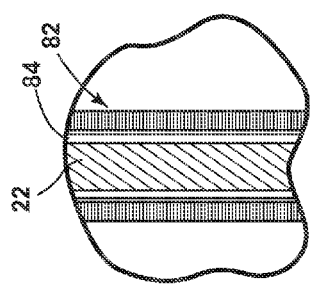
FIG. 8 is sectional view taken along line IV-IV of FIG. 3 showing the open framework of the acoustic panel according to another embodiment of the invention.

FIGS. 7 and 8 illustrate a surface modification comprising applying acoustically attenuating material to the open framework 22 surfaces using an adhesive according to another embodiment of the invention. FIG. 7 shows a cellular solid body 72 affixed to the open framework 22 by an adhesive layer 74. The material, cell size, tortuosity, porosity, material thickness and material density of the cellular solid body are all chosen to attenuate one or more predetermined frequencies of sound. The cellular solid body 72 may attenuate sounds by selecting the above mentioned characteristics to dampen the sound waves using absorption thereby converting the sound waves into heat energy and/or disperse the sound waves by selecting a particle size and shape to scatter the sound waves wherein the particles 52 act as the scatterer thereby reducing the intensity of the resultant scattered sounds waves compared to the original sound wave.

FIG. 8 shows a fabric layer 82 affixed to the open framework 22 by an adhesive layer 84. The fabric layer 82 may attenuate sounds by selecting a fabric to dampen the sound waves using absorption thereby converting the sound waves into heat energy and/or disperse the sound waves by selecting a particle size and shape to scatter the sound waves wherein the fabric layer 82 acts as the scatterer thereby reducing the intensity of the resultant scattered sounds waves compared to the original sound wave.

Figure 9:
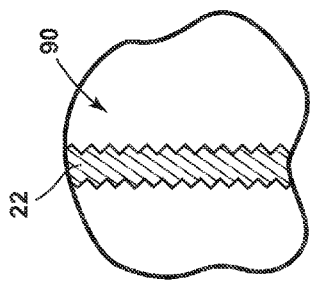
FIG. 9 is sectional view taken along line IV-IV of FIG. 3 showing the open framework of the acoustic panel according to another embodiment of the invention.
Figure 10:
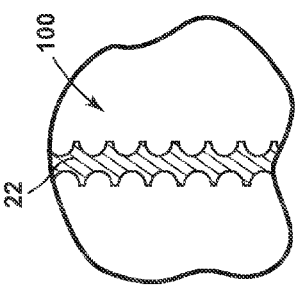
FIG. 10 is sectional view taken along line IV-IV of FIG. 3 showing the open framework of the acoustic panel according to another embodiment of the invention.

FIGS. 9 and 10 illustrate a surface modification comprising etching or texturing the open framework 22 according to another embodiment of the invention. FIG. 9 shows an etching 90 applied to the open framework 22. The geometry of the etching 90 is predetermined so as to scatter one or more predetermined frequencies of sound wherein the etching 90 acts as the scatterer thereby reducing the intensity of the resultant scattered sounds waves compared to the original sound wave.

FIG. 10 shows an open framework 22 after texturing 100 has been performed on the open framework 22. The texturing may be applied using stamping, rolling or the like and may have a predetermined geometry so as to scatter one or more predetermined frequencies of sound wherein the texturing 100 acts as the scatterer thereby reducing the intensity of the resultant scattered sounds waves compared to the original sound wave.

In another embodiment, the texturing 100 of the open framework 22 may be applied using additive manufacturing, or an additively manufactured open framework 22 may include texturing 100 as an integral feature.

Figure 11:
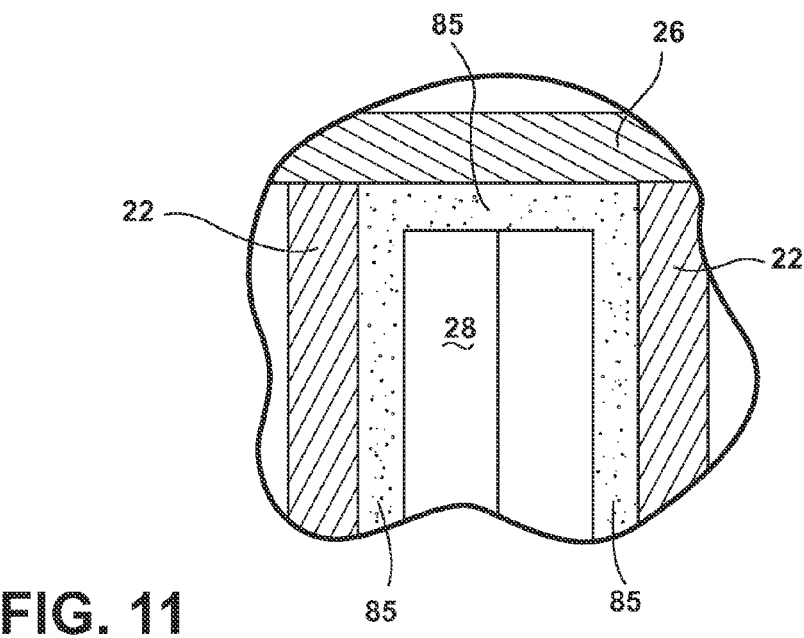
FIG. 11 is a sectional view taken along line VI-VI of FIG. 3 showing the open framework and backing sheet according to another embodiment of the invention.

FIG. 11 shows a cell 28 in which a surface modification 85 as shown and described in FIGS. 4 through 10 is applied to the open framework 22 as well as the backing sheet 26 wherein the surface modification 85 applied to the backing sheet 26 increases the attenuation of sound energy.

Figure 12:
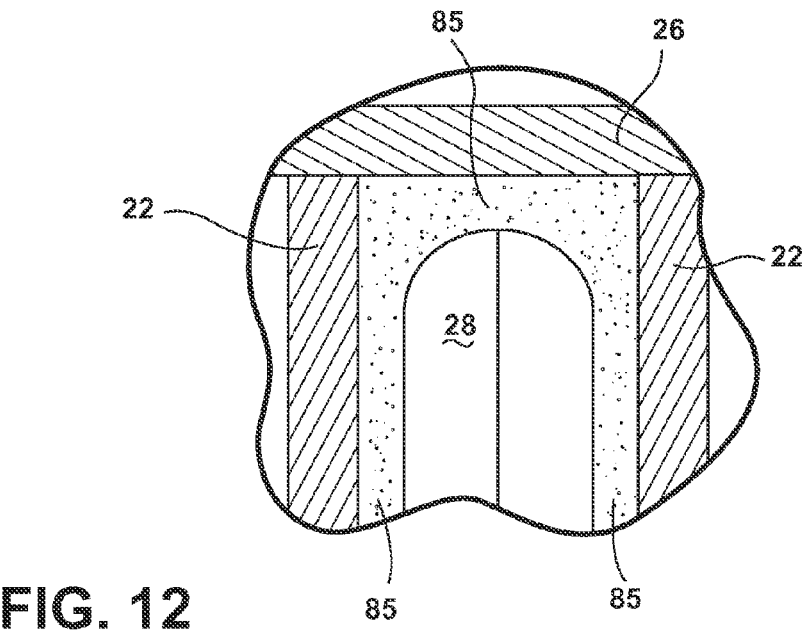
FIG. 12 is a sectional view taken along line VI-VI of FIG. 3 showing the open framework and backing sheet according to another embodiment of the invention.

FIG. 12 shows a cell 28 in which the surface modification 85 as shown and described in FIGS. 4 through 10 applied to the open framework 22 and the backing sheet 26 wherein the surface modification 85 creates a desired geometry within the cell 28 to further enhance the attenuation of sound energy.

It will be understood that the above mentioned surface treatments, modifications and applications according to the various embodiments may be applied only to a portion of the open framework 22 or to the entire open framework 22. It will further be understood that the above mentioned surface treatments, modifications and applications according to the various embodiments may be applied at any stage of the annular acoustic panel manufacturing process.

The embodiments described above provide for a variety of benefits including that the aircraft engine assembly comprising the annular acoustic panel according to the invention may act to further attenuate aircraft engine sound over traditional acoustic panels by providing an acoustically attenuating surface treatment to the open framework of the annular acoustic panel. Furthermore, by selecting predetermine materials and geometries for the open framework and surface treatments, predetermined frequencies of sound may be attenuated.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft engine assembly comprising:
an aircraft engine;
a nacelle configured to surround the aircraft engine and having an inlet open to ambient air;
an annular acoustic panel, comprising an open framework, made from a first material, forming a plurality of cells, and a surface treatment provided on the open framework to increase the sound attenuation of the open framework relative to the open framework without the surface treatment, the surface treatment comprising a surface modification including at least one of a nanostructure comprising filaments projecting away from the open framework, a coating, a particulate layer, a fabric, or a cellular solid body;
wherein at least one of the length, angle of projection, and porosity of the filaments may be selected to attenuate one or more predetermined frequencies of sound, and the annular acoustic panel is provided within the nacelle and sound emitted from the aircraft engine is attenuated by the annular acoustic panel.

2. The aircraft engine assembly of claim 1 wherein the nacelle comprises an inlet section defining the inlet and the acoustic panel is mounted to the inlet section and defines an inner surface.

3. The aircraft engine assembly of claim 1 wherein the aircraft engine comprises a fan section and the acoustic panel is mounted to the fan section.

4. The aircraft engine assembly of claim 1 wherein at least some of the cells form a portion of a Helmholtz resonator, and the open framework comprises a honeycomb structure.

5. The aircraft engine assembly of claim 4 further comprising an impervious backing sheet located on a rear side of the honeycomb structure and a perforated front sheet located on a front side of the honeycomb structure.

6. The aircraft engine assembly of claim 1 wherein the surface treatment has a geometry that at least disperses or attenuates sound waves.

7. The aircraft engine assembly of claim 1 wherein the coating comprises at least one of a deposition coating or a polymer coating.

8. The aircraft engine assembly of claim 1 wherein the particular layer comprises particles of a size selected to attenuate one or more predetermined frequencies.

9. The aircraft engine assembly of claim 1 wherein the surface modification comprises at least one of at etching the surface of the open framework and texturing the surface of the open framework.

10. The aircraft engine assembly of claim 9 wherein the texturing comprises an additive manufacturing applied texture, stamping, or rolling.

11. The aircraft engine assembly of claim 1 wherein the surface treatment is applied only to a portion of the open framework or to the impervious backing sheet.

* * * * *